No. 820,235. PATENTED MAY 8, 1906.
A. MOORE.
APPARATUS FOR THE COMBUSTION OF PULVERULENT FUEL.
APPLICATION FILED JULY 12, 1905.
2 SHEETS—SHEET 1.
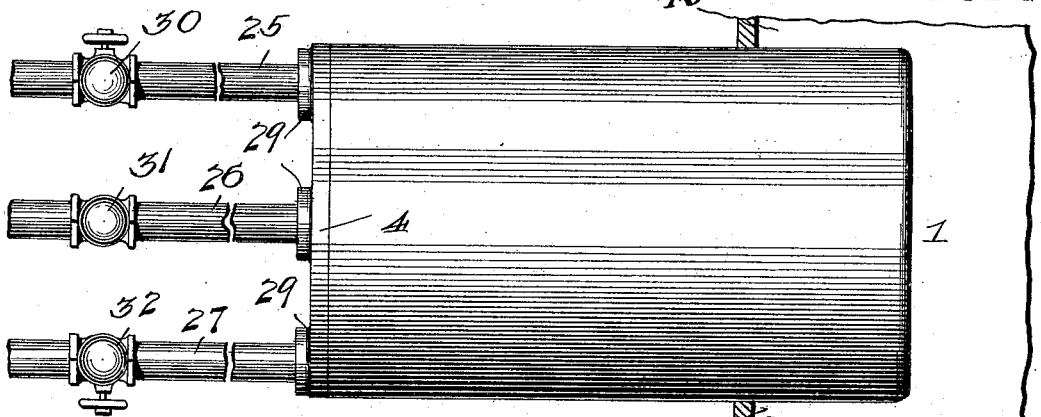
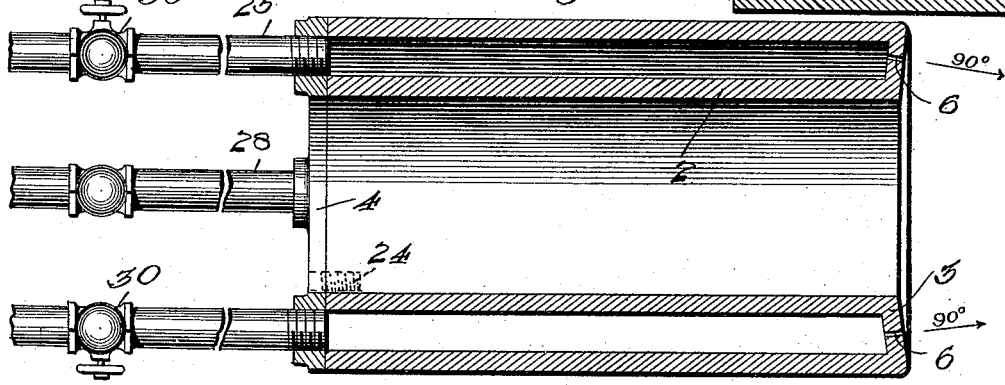
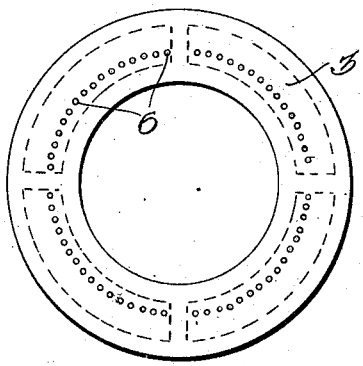
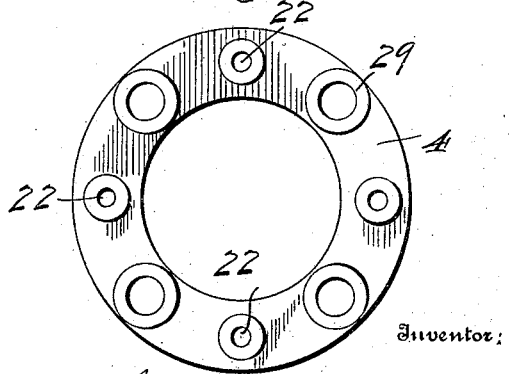

No. 820,235. PATENTED MAY 8, 1906.
A. MOORE.
APPARATUS FOR THE COMBUSTION OF PULVERULENT FUEL.
APPLICATION FILED JULY 12, 1905.
2 SHEETS—SHEET 2.
Fig. VII.
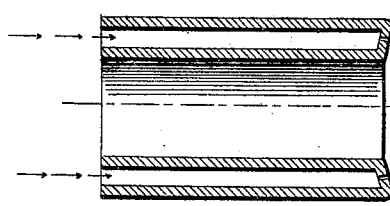
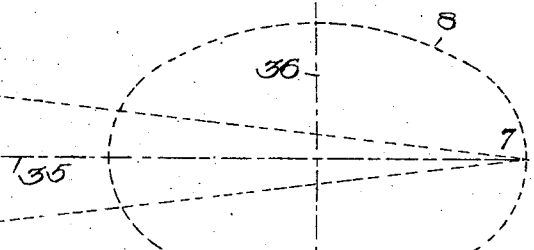
Fig. VIII.
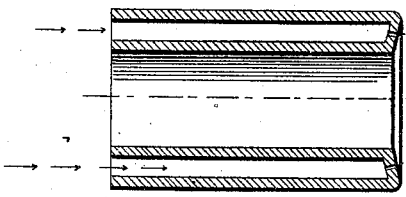
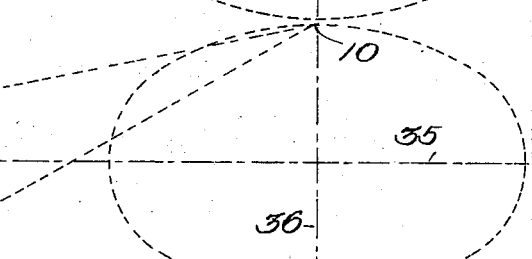
Fig. IX.
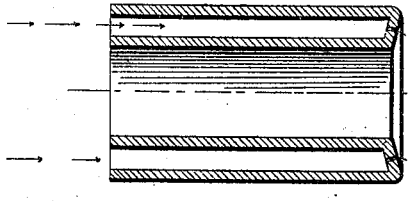
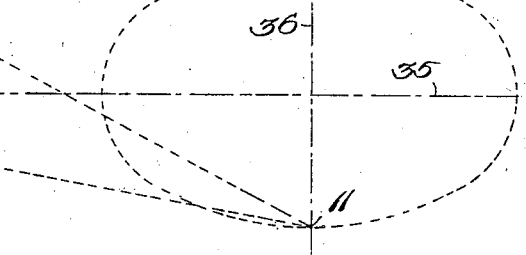
Fig. V.
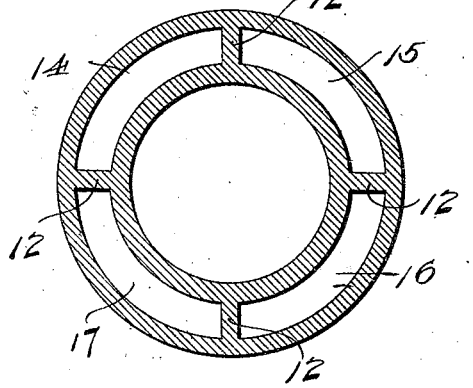
Fig. VI.
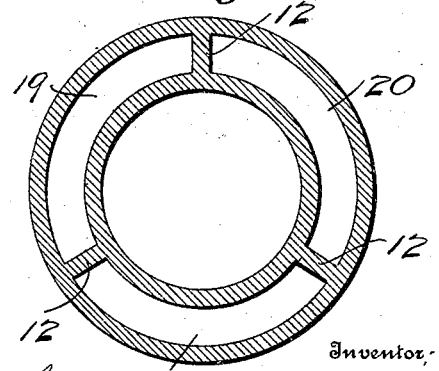
Witnesses
T. L. Mockane
M. H. Yates
Inventor
Aman Moore
By Joseph F. Atkins,
Attorney.

UNITED STATES PATENT OFFICE.

AMAN MOORE, OF PORTLAND, COLORADO.

APPARATUS FOR THE COMBUSTION OF PULVERULENT FUEL.

No. 820,235.          Specification of Letters Patent.          Patented May 8, 1906.

Application filed July 12, 1905. Serial No. 269,403.

*To all whom it may concern:*

Be it known that I, AMAN MOORE, of Portland, county of Fremont, State of Colorado, have invented certain new and useful Improvements in Apparatus for the Combustion of Pulverulent Fuel, of which the following is a specification.

The object of my invention may be defined in general terms to be the production of apparatus for promoting the utilization in the arts in which it is available for use of combustible material in pulverulent form as a fuel.

The arts within the purview of my invention are not restricted in number; but my invention is especially applicable to the manufacture of the substance commercially known as "hydraulic cement," and it is deemed conducive to the explication of the principle of my invention to make specific reference to certain utilities among a large number which it exhibits when employed in cement manufacture. Proceeding accordingly, it may be well to state that certain conditions are regarded as essential to the production of a sound cement. Among the number of such conditions may be mentioned as perhaps the most important the production of intense heat and the most perfect combustion of the fuel employed for the production of the required temperature that may be obtained. A high temperature is necessary to the proper calcining of the cement mixture, and perfect combustion contributes to the minimizing of the residual solid product of combustion or ash, it being accepted in the art that not only is proper calcination of the cement mixture necessary, but that the ash of the fuel which constitutes in the calcined product a mere make-weight whose absence would be preferable to its presence if it were practicable to eliminate it should be reduced to a minimum.

My apparatus, designed and adapted to accomplish the object above specified in general terms, possesses several characteristic qualities and constituents which separately and collectively contribute to the common end proposed. For example, the combustion of pulverulent fuel in common with that of all fuels is directly dependent upon the amount of oxygen available for its support. My apparatus takes cognizance of that condition in providing the fuel delivered to the combustion-chamber or point of combustion with an oxygenous envelop whose constant presence serves to promote the combustion required of the fuel. Again, one purpose of the use of fuel in pulverulent form is to secure, in effect, instantaneous combustion of all the fuel when it reaches the point at which combustion should take place. It is therefore one of the functions of my invention to keep the particles of the fuel segregated, or, in other words, to perfectly preserve the pulverulent character of the fuel until it reaches the point intended for its actual consumption through combustion. There is still another point of most important consideration in the combustion of fuels generally, but in no wise diminished in respect to combustion of pulverulent fuel, and that is the liability of the lowering of the temperature in a furnace through the supply of fuel in excess at one point. Recognition of that fact procures the adoption of the special appliances and the employment of great care in the stoking of furnaces adapted for the consumption of massive fuel.

I provide in my invention for the distribution at will of the fuel, with its oxygenous envelop, to as many points of combustion within the furnace or combustion-chamber as may be necessary or desirable to secure within the same the most complete combustion without interruption or diminution. In connection with the system of distribution employed by me I have mentioned the employment of stoking appliances and methods, for the reason that I regard them as analogous to that feature of my invention under present consideration.

What constitutes my invention will be hereinafter specified in detail and succinctly set forth in the appended claims.

Referring to the drawings which accompany and constitute a part of this specification, Figure I is a side elevation of that which for convenience of designation I denominate my "atomizer," showing diagrammatically its application to a combustion-chamber. Fig. II is a longitudinal vertical section of the atomizer. Fig. III is an elevation of the discharge end of the atomizer. Fig. IV is a similar view of the opposite end thereof. Fig. V is a transverse vertical section of Fig. I, showing the internal construction of one form of the barrel of the atomizer in section. Fig. VI is a view similar to Fig. V, showing a modification of the barrel construction. Fig. VII is a vertical section of the barrel of the atomizer detached and showing diagrammatically a flame projected across and to the opposite side of a diagrammatically-indicated combustion-chamber. In this figure equilibrium of pressure in the several pressure-chambers adapted for the supply of an oxygenous fluid is indicated by three arrows above and an equal number below. Fig. VIII is a view similar to Fig. VII, illustrating diagrammatically distribution of fuel with and by the aid of its oxygenous envelop to the medial portion and to one side of the diagrammatically-indicated combustion-chamber. Preponderance of pressure in one pressure-chamber over that in the opposite chamber is indicated by two arrows above and four arrows below. Fig. IX is a view similar to Fig. VII, illustrating fuel distribution to the side of the combustion-chamber opposite the side to which it is shown as distributed in Fig. VIII. Preponderance of pressure in the pressure-chamber is shown by four arrows above against two arrows below.

Referring to the numerals on the drawings, 1 indicates the outer wall, 2 the inner wall, and 3 the end wall, which, combined with an end plate 4, constitute that which I designate as the "barrel" of my atomizer in the preferred form of embodiment of my invention illustrated. The walls 1 and 2 are preferably coaxial cylinders united by an integral end wall 3, while the plate 4 is preferably an annulus of a width sufficient to extend flush with the walls 2 and 3, against and opposite the ends of which it is secured in such manner as to effect a close joint between the parts. The inner wall 2 of the barrel surrounds and, with the plate 4, defines the center bore of my atomizer, through which, as by a blast of air or through ordinary or suitable means common in the art or arts to which my invention is adapted, as has been specified, fuel in pulverulent or equivalent form is forced in the quantity desired, determinable by the temperature required to be generated in the furnace 40. No other means than the center bore for the fuel discharge are illustrated, because the means contemplated are well known in the art and do not in themselves constitute any part of my present invention. The walls 1 and 2, spaced and united by the integral wall 3 and the plate 4, define between them a space for the reception of an oxygenous fluid—such, for example, as air or steam—which being discharged about the blast through the center bore constitutes an oxygenous or combustion-supporting envelop about the fuel-supply. I prefer to provide as a means of discharge of the contents of said space and for the formation of the oxygenous envelop an annular or substantially annular series of equidistant orifices or drill-holes 6, (see Fig. III,) preferably arranged to discharge under equal determinate pressure toward a definite focal point—such, for instance, as that indicated by the reference-numeral 7 in Fig. VII of the drawings. The series of orifices 6 are preferably drilled through the wall 3.

It is one of the principal objects of my invention, as has been specified, to provide for the distribution of the fuel supplied through my atomizer to any point within the furnace or combustion-chamber (diagrammatically indicated in Figs. VII to IX, inclusive, of the drawings) by the ellipse 8. Having postulated that the point of fuel-supply is subject, without limitation, to the will of the operator, it may be specified that such distribution may be regarded, in effect, as a shifting of the focal point from the conventionally-determined normal focal point 7 to any other focal point desired. Accordingly I have indicated in Figs. VIII and IX, by way of illustration, two other focal points 10 and 11. The barrel being installed in practice in fixed relationship to the furnace which it supplies, the means of distribution or shifting of the focal point which I employ and which constitute an important feature of my invention consists of means for producing a dirigible envelop, which is constituted, as specified, of an oxygenous fluid.

The dirigibility of the envelop by whatever means obtainable characterizes the principle of my invention. In respect to the apparatus the preferred means employed consists of a division of the space between the walls 1 and 2 into a plurality of chambers definable by longitudinally-disposed septa 12, extending between the walls 1 and 2 and which are preferably cast integrally with them. The number of septa is determinable by the number of chambers employed, which may be varied as preferred. For the purpose of this specification I show in Fig. V four septa, defining four separate chambers 14, 15, 16, and 17, and in Fig. VI, I show three septa 12, defining three separate chambers 19, 20, and 21. The septa afford convenient means for securing the annular plate 4 to the barrel, which is shown in Fig. IV provided with screw-holes 22, disposed with reference to the septa with which the barrel is provided, four screw-holes being shown in said figure to correspond with the four septa illustrated wherever they appear save in Fig. VI of the drawings. Into these screw-holes are passed and screwed into threaded apertures provided for them in the several septa screws 24. (Indicated by dotted lines in Fig. II of the drawings.)

Each of the fluid-supply chambers 14, 15, 16, and 17, for example, is provided with an independently-controllable source of fluid-supply, represented in Figs. I and II of the drawings by pipes 25, 26, 27, and 28, each threaded into a nipple 29, provided for it preferably in the plate 4. (Compare Figs. I and II and IV.) 30, 31, 32, and 33 indicate valves with which the pipes aforesaid are respectively provided and which afford independent means for control of the pressure and volume of the fluid which passes through them.

The fluid-pressure within the several chambers may vary from a few ounces to a pressure, it may be, of hundreds of pounds. If the pressure be heavy and a large volume of combustion-supporting fluid be passed under equal pressure into the several chambers and discharged therefrom, it will produce a quicker combustion and shorter flame than if no fluid or only a small volume of fluid or fluid at low pressure were discharged through the atomizer. It is therefore possible by variation of equal pressures in the several chambers to shift the focal point from the position 7 (indicated in Fig. VII of the drawings) to any position desired along the axis of abscissas 35. If, on the other hand, the pressure in one or more of the chambers be augmented beyond that in the other chamber or chambers, the focal point may be shifted, not only as specified, with reference to the line of the axis of abscissas 35, but also to any point of departure therefrom—such, for example, as to points 10 and 11, (see Figs. VIII and IX,) indicated, respectively, upon the axis of ordinates 36. It is therefore obvious that by variation of pressure and of the ratio of pressure in the several chambers any point within the combustion-chamber, without reference to its shape, but indicated diagrammatically in Figs. VIII to IX, inclusive, of the drawings by the ellipse 8, may be reached as a focal point.

It may be observed that by reason of the convergent disposition of the discharge-orifices 6 around the center bore of the atomizer the current of discharge of the combustion-supporting fluid is made athwart that of the fuel discharge. It having been specified that the fuel-supply is preferably a dust-laden air-blast and that the oxygenous envelop is preferably a blast of air or steam, it will therefore be obvious to one skilled in the art that the conflict of the two currents tends not only to an intimate commingling of an oxygenous fluid with the fuel to be ignited, but also to the preservation of the pulverulent character of the fuel, in which state each separate particle of it being then most accessible to the combustion-supporting fluid which penetrates the mass is presented in the condition most favorable to its quick and complete combustion.

What I claim is—

1. The combination with a combustion-chamber and stationary means for the discharge of pulverulent fuel into the combustion-chamber, of fluid means for directing the same to any point within said chamber.

2. The combination with a combustion-chamber and stationary means for the discharge of pulverulent fuel and combustion-supporting fluid into the combustion-chamber, of controllable fluid-pressure means for directing the same to any point within said chamber.

3. The combination with a combustion-chamber and stationary means for the discharge of pulverulent fuel into the combustion-chamber, of dirigible fluid means for directing the same to any point within said chamber.

4. The combination with a combustion-chamber and stationary means for the discharge of pulverulent fuel and combustion-supporting fluid into the combustion-chamber, of dirigible controllable fluid-pressure means for directing the same to any point within said chamber.

5. The combination with a combustion-chamber and stationary means for the discharge of pulverulent fuel and combustion-supporting fluid into the combustion-chamber, of means for discharging a dirigible fluid in the form of an envelop about the fuel in a current athwart that of the fuel-discharge.

6. The combination with a combustion-chamber and means for the discharge of pulverulent fuel into the combustion-chamber, of a dirigible fluid envelop about said fuel for directing the same to any point within said chamber.

7. The combination with a combustion-chamber and means for the discharge of pulverulent fuel into the combustion-chamber, of a fluid envelop about said fuel, dirigible by fluid means for directing the fuel to any point within said chamber.

8. The combination with a combustion-chamber and means for the discharge of pulverulent fuel into the combustion-chamber, of a fluid envelop about said fuel dirigible through variation of the relative pressures of its parts for directing the fuel to any point within said chamber.

9. The combination with a combustion-chamber and means for the discharge of pulverulent fuel and combustion-supporting fluid into the combustion-chamber, of a fluid envelop about said fuel dirigible through variation of the relative pressures of its parts for directing the fuel and combustion-supporting fluid to any point within said chamber.

10. In an atomizer for the purpose specified the combination with a barrel provided with a center bore for delivery of pulverulent fuel, of a plurality of fluid-supply chambers having means of discharge about the center bore, and independent means of fluid-supply to said chambers respectively.

11. In an atomizer for the purpose specified the combination with a barrel provided with a center bore for delivery of pulverulent fuel, of a plurality of fluid-supply chambers having means of discharge about the center bore, and independently-controllable means of fluid-supply to said chambers respectively.

12. In an atomizer for the purpose specified the combination with a barrel provided with a center bore for delivery of pulverulent fuel, of a plurality of fluid-supply chambers having means of discharge about the center bore, and independent means for control of the pressure and volume of the fluid which passes through them respectively.

13. The combination with a combustion-chamber and means for the discharge of pulverulent fuel and combustion-supporting fluid to a focal point within the combustion-chamber, of fluid means for shifting, at will, the focal point of such discharge.

14. In apparatus of the kind described the combination with inner, outer, and two end walls constituting a barrel provided with a center bore, of septa between the walls aforesaid defining a plurality of fluid-supply chambers, and means of discharge therefrom about the center bore.

15. In apparatus of the kind described the combination with inner, outer, and two end walls constituting a barrel provided with a center bore, of septa between the walls aforesaid defining a plurality of fluid-supply chambers, and convergent means of discharge therefrom about the center bore.

In testimony whereof I have hereunto signed my name in the presence of two subscribing witnesses.

AMAN MOORE.

Witnesses:
R. J. MORSE,
L. D. GILBERT.